US009277535B2

(12) United States Patent
Cattani et al.

(10) Patent No.: US 9,277,535 B2
(45) Date of Patent: *Mar. 1, 2016

(54) SIMULTANEOUS DELIVERY OF A TELEPHONY CALL OVER A BROADBAND ACCESS NETWORK AND A CIRCUIT-SWITCHED NETWORK

(71) Applicant: Motorola Mobility LLC, Libertyville, IL (US)

(72) Inventors: Mary Colleen Cattani, Brigantine, NJ (US); Pierre A. Brice, Edison, NJ (US)

(73) Assignee: Google Technology Holdings LLC, Mountain View, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/739,495

(22) Filed: Jan. 11, 2013

(65) Prior Publication Data

US 2013/0127978 A1 May 23, 2013

Related U.S. Application Data

(63) Continuation of application No. 12/471,852, filed on May 26, 2009, now Pat. No. 8,379,632.

(51) Int. Cl.
*H04L 12/66* (2006.01)
*H04W 72/04* (2009.01)
*H04M 7/12* (2006.01)
*H04L 29/06* (2006.01)

(52) U.S. Cl.
CPC ............ *H04W 72/04* (2013.01); *H04L 29/06* (2013.01); *H04M 7/1215* (2013.01)

(58) Field of Classification Search
CPC ...................................... H04L 12/66

USPC ............. 370/352, 329; 455/445, 456.1, 518, 455/519, 566, 575

See application file for complete search history.

(56) References Cited

U.S. PATENT DOCUMENTS

| 5,329,308 | A | 7/1994 | Binns et al. |
| 5,774,527 | A | 6/1998 | Handelman et al. |
| 5,790,180 | A | 8/1998 | Wild |
| 6,219,355 | B1 | 4/2001 | Brodigan |
| 6,542,739 | B1 * | 4/2003 | Garner .......................... 455/427 |

(Continued)

*Primary Examiner* — Dang Ton
*Assistant Examiner* — Nourali Mansoury
(74) *Attorney, Agent, or Firm* — Lerner, David, Littenberg, Krumholz & Mentlik, LLP

(57) ABSTRACT

A call processing module includes a first network interface configured to communicate over a packet-switched network and a second network interface configured to communicate with a local subscriber over a broadband access network employing RF modulation. A call manager is provided which includes a database associating a local subscriber telephone number with an address of a client device associated with the local subscriber for a plurality of subscribers authorized to receive telephony service. A frequency handler is provided for allocating to the client device a receive frequency and a transmit frequency to be used by the client device over the broadband access network during a telephony call. The call processing module also includes a session manager configured to generate and receive signaling messages for establishing the telephony call between the local subscriber and a remote subscriber over the broadband access network and the packet-switched network as well as over the broadband access network, the packet-switched network and a circuit-switched network in communication with the packet-switched network.

18 Claims, 8 Drawing Sheets

(56) References Cited

U.S. PATENT DOCUMENTS

| | | |
|---|---|---|
| 6,732,368 B1 | 5/2004 | Michael et al. |
| 6,917,610 B1* | 7/2005 | Kung et al. ............... 370/352 |
| 7,616,654 B2* | 11/2009 | Moran et al. ............. 370/431 |
| 8,369,311 B1* | 2/2013 | Kirchhoff et al. ......... 370/352 |
| 2004/0139471 A1* | 7/2004 | Geen et al. ............... 725/106 |
| 2005/0198684 A1 | 9/2005 | Stone et al. |
| 2006/0142012 A1* | 6/2006 | Kirchhoff et al. ......... 455/445 |
| 2008/0075115 A1 | 3/2008 | Brendes et al. |
| 2008/0098445 A1* | 4/2008 | Hildebrand et al. ....... 725/114 |
| 2009/0025027 A1* | 1/2009 | Craner ...................... 725/32 |
| 2009/0034512 A1 | 2/2009 | Bantukul et al. |

\* cited by examiner

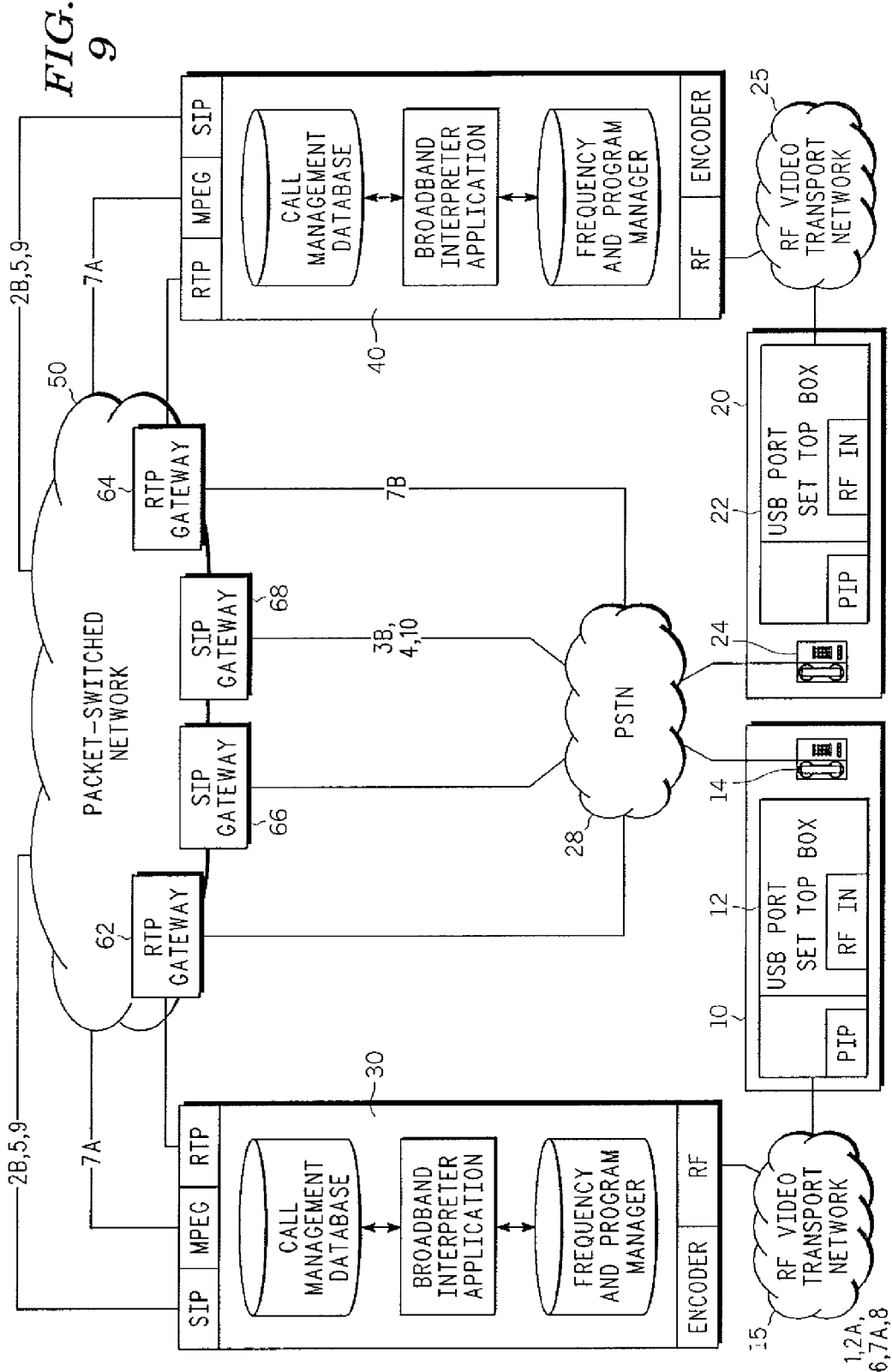

SIMULTANEOUS DELIVERY OF A TELEPHONY CALL OVER A BROADBAND ACCESS NETWORK AND A CIRCUIT-SWITCHED NETWORK

CROSS-REFERENCE TO RELATED APPLICATIONS

This application is a continuation of U.S. patent application Ser. No. 12/471,852 filed on May 26, 2009, the contents of which are herein incorporated by reference in entirety.

BACKGROUND

In recent years integration of cable television and telephone networks has become a commercial reality. For instance, telephony services can be seamlessly carried over both networks. One class of telephony services, referred to as Voice over Internet Protocol ("VoIP") services, is a relatively new service that competes with plain old telephone service (POTS) providers. VoIP, which may also be referred to as IP Telephony, Internet telephony or Broadband telephony, is the routing of voice conversations over an IP network such as a private network operated by cable television or telecommunication providers or public networks such as the Internet, or any combination thereof. VoIP subscribers make and receive calls as they would over the traditional publicly switched telephone network (PSTN). Accordingly, IP networks such as a cable television network need to communicate with conventional telephone networks and thus network elements such as gateways and the like have been developed to support such communication.

SUMMARY OF THE INVENTION

In accordance with one aspect of the invention, a call processing module is provided. The call processing module includes a first network interface configured to communicate over a packet-switched network and a second network interface configured to communicate with a local subscriber over a broadband access network employing RF modulation. A call manager is provided which includes a database associating a local subscriber telephone number with an address of a client device associated with the local subscriber for a plurality of subscribers authorized to receive telephony service. A frequency handler is provided for allocating to the client device a receive frequency and a transmit frequency to be used by the client device over the broadband access network during a telephony call. The call processing module also includes a session manager configured to generate and receive signaling messages for establishing the telephony call between the local subscriber and a remote subscriber over the broadband access network and the packet-switched network as well as over the broadband access network, the packet-switched network and a circuit-switched network in communication with the packet-switched network.

In accordance with another aspect of the invention, a method is provided for establishing a telephony call. The method includes receiving over a local broadband access network a request from a calling party to establish a telephony call between the calling party and a called party, the request including a telephone number of the called party. A call processing unit is alerted of the request by transmitting an alert message over a packet-switched network. A first answer message is received from the call processing unit over the packet-switched network indicating whether the telephony call will be answered as a voice-only telephony call on a circuit-switched network or as a video telephony call on a remote broadband access network. A response is presented to the calling party from the called party by transmitting one or more additional messages to the calling party over the local broadband access network. At least one of the additional messages indicates if the telephony call will be answered as a voice-only telephony call or as a video telephony call and identifies a channel to be used by the calling party when communicating with the called party over the local broadband access network.

BRIEF DESCRIPTION OF THE DRAWINGS

FIG. 9 shows an operating environment similar to FIG. 1 except with messages superimposed which correspond to the signaling diagram shown in FIG. 8.

DETAILED DESCRIPTION

Despite the current degree of interactivity that exists between the PSTN and IP networks such as the cable network or other broadband access network, a calling party cannot simultaneously place a call to a called party over both networks such that the called party has the option of answering the call on an end user device (e.g., a telephone) connected to the PSTN or an end user device (e.g., a set top box) connected to the cable network. Such a telephony call may be placed using the methods and techniques described herein. As a result, if the called party answers the call on an end user device connected to the PSTN, the call may be established as a voice-only telephony call. On the other hand, if the called party answers the call on an end user device connected to the cable network or other broadband access network, the call may be established as a video telephony call, assuming the end user device is sufficiently equipped with a camera and microphone As discussed in more detail below, a call processing unit is provided that allows a local subscriber (i.e., the calling party) to establish a video telephony call using a set top box or other client device over a broadband access network as well as over a circuit-switched network such as the Public Switched Telephone Network (PSTN) or radio frequency communication networks such as certain cellular or satellite communication networks.

The remote subscriber (i.e., the called party) has the option of receiving the call on either a set top box (via the broadband network) or a telephone (via the PSTN). Once the call has been answered, either party may re-route the call from their set top box to their telephone, or visa versa. If the call is established between the local and remote subscribers' set top boxes, the call may be a video call in which the video is presented on the display device that is connected to the set top box. The call processing unit, referred to herein as a Broadband Interpreter (BBI), generates and tracks two simultaneous calls through two different networks: the circuit-switched network and the broadband access network. To accomplish this, the BBI needs connectivity to both networks.

Figure 1:
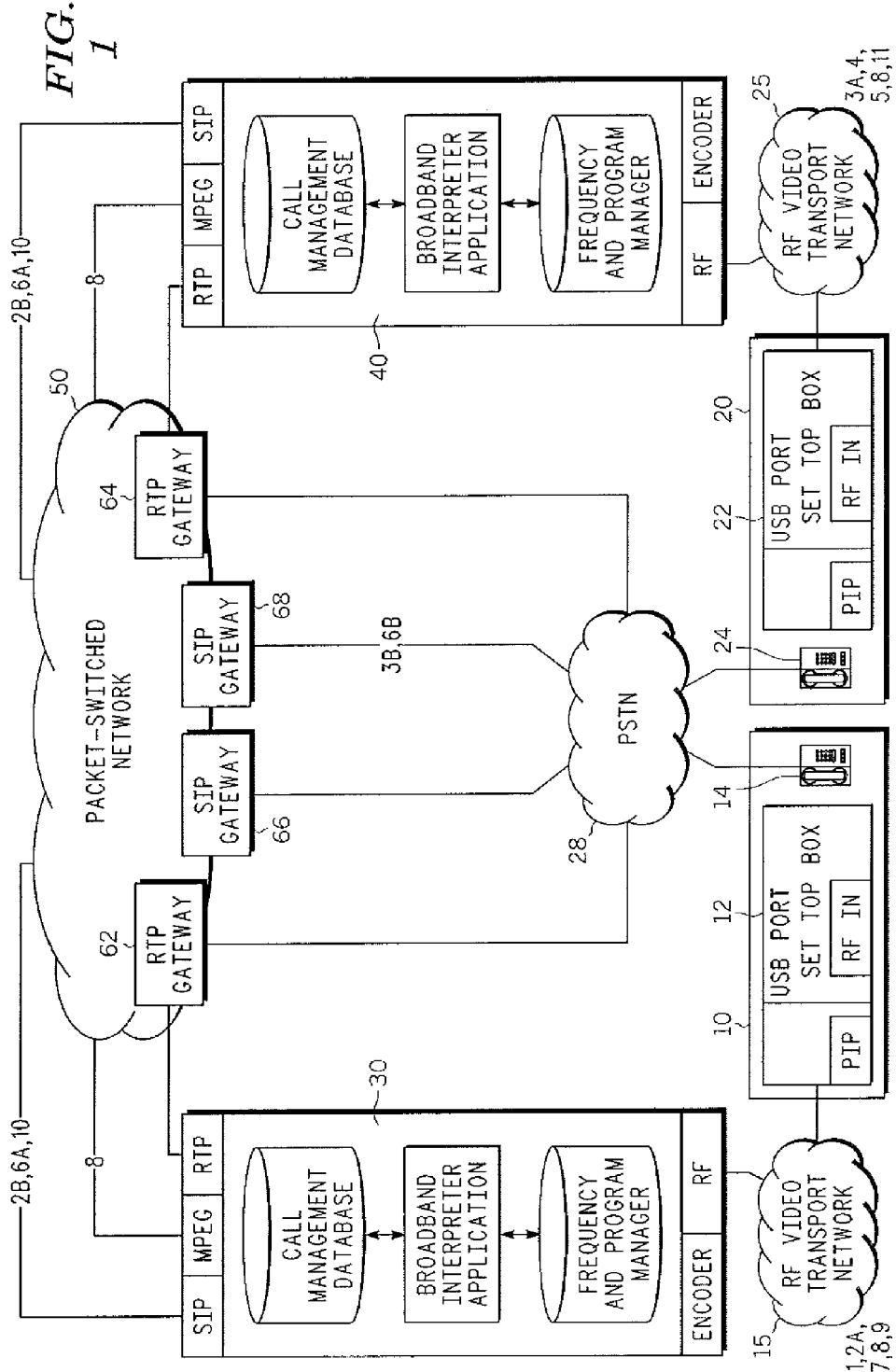
FIG. 1 shows the operating environment in which a broadband interpreter (BBI) is employed.

FIG. 1 shows the operating environment in which the BBI is employed. As shown, a local subscriber 10 is equipped with both a client device such as set top box 12 and a telephone 14. Similarly, remote subscriber 20 is equipped with both a client device such as set top box 22 and a telephone 24. The telephones 14 and 24 are in communication with the PSTN 28 or other circuit-switched network. STB 12 and STB 22 communicate over broadband access networks 15 and 25, respectively. Although for generality the STBs 12 and 22 are shown as communicating over distinct broadband access networks, they may of course communicate over the same broadband network as well.

Broadband access networks 15 and 25, which in some implementations may be a Hybrid Fiber-Coax (HFC) network, include an array of radio frequency (RF) transmitter edge devices such as edge Quadrature Amplitude Modulation (QAM) modulators (not shown in FIG. 1). As used herein, the term "QAM" refers to modulation schemes used for sending RF signals over broadband access networks. Such modulation schemes might use any constellation level (e.g. QAM-16, QAM-64, QAM-256 etc.) depending on the details of the broadband access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users. Each transport stream is mapped to a downstream QAM channel. Each QAM channel has a carrier frequency that differs from the carrier frequency of the other channels. The transport streams, which may be MPEG or H.264 transport streams, for example, are mapped according to a channel map or plan designed by the MSO that operates the broadband access network.

A BBI 30 and 40 is respectively associated with each of the broadband access networks 15 and 25. In this way the local STB 12 can communicate with BBI 30 over broadband access network 15 and the remote STB 22 can communicate with BBI 40 over broadband access network 25. In some implementations the BBIs 30 and 40 may be located in the headend of the broadband access network with which they are respectively associated. The BBIs 30 and 40 may be in communication with one another over a public or privately-operated packet-switched network 50. For purposes of illustration the packet-switched network is depicted as operating in accordance with the Internet suite of protocols and thus for convenience from time to time will be referred to herein as the Internet.

Figure 2:
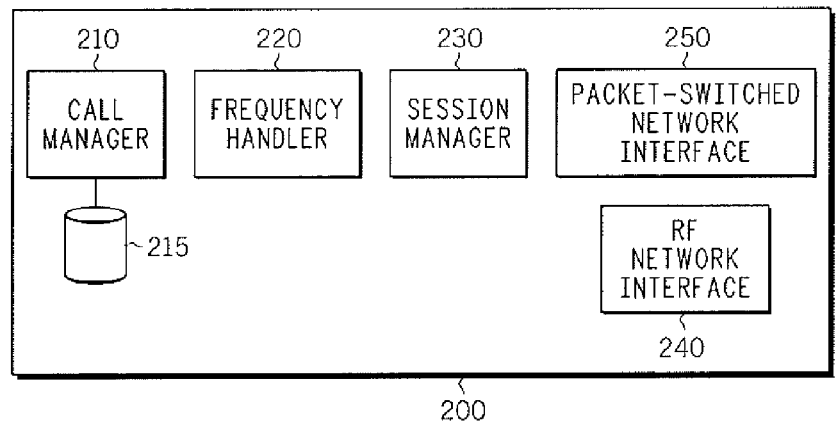
FIG. 2 shows a simplified diagram of one example of the logical architecture of a BBI.

FIG. 2 shows a simplified diagram of one example of the logical architecture of a BBI 200 such as BBIs 30 and 40. The architecture includes abstracted logical elements that are typically implemented in hardware, software, firmware, or any combination thereof. The BBI 200 includes a call manager 210 and a frequency handler 220. The call manager 210 maintains a database 215 having an entry for each subscriber that is registered with that particular BBI. Each entry associates a network address of a subscriber's client device (e.g., a STB MAC address) with the subscriber's telephone number as well as any associated subscriber parameters such as video voice mail. The frequency handler 220 is responsible for assigning channels (e.g., transmit and receive frequencies and a program number) to the STBs for each call that is carried on a transport stream over the broadband access network. The channels are made available to the BBI by the MSO that operates the broadband access network. To accomplish this, the channel map relating channels to services carried on those channels is dynamically updated for receipt by the BBI. That is, the BBI is aware of which frequencies, modulation modes, and program ID numbers are assigned to each service on the current channel map and which frequencies, modulation modes, and program ID numbers are available for use when a call setup is requested. The BBI will select the program number and the transmit and receive frequencies that are to be assigned from among those that are available in the channel map received from the MSO at the time a call setup is requested. When the call that is to be established is a voice-only call, the BBI will assign lower bandwidth frequencies and program numbers than when video calls are to be established.

The BBI 200 shown in FIG. 2 also includes a session manager 230 to set up new communication sessions, terminate existing sessions and re-route existing sessions between a subscriber's telephone and set top box. Among other things, the session manager 230 allows the BBIs to communicate with one another over the packet-switched network 50 using various signaling protocols. For instance, in the case of the Internet, the BBIs may make use of the Session Initiation Protocol (SIP) to set up and control calls that are established between them. SIP is an example of an application level signaling protocol used by an initiating device to locate another device in order to establish a communication session. Other protocols that may be used include SS7. If SIP is employed, the session manager 230 may include a SIP server and client to respectively generate and receive SIP messages. The BBI 200 communicates with the packet-switched network 50 via the packet-switched network interface 250. Similarly, the BBI 200 communicates with the broadband access network via RF network interface 240. The RF network interface 240 allows the BBI to exchange signaling messages and video and voice-only calls with the set top boxes or other client devices. To accomplish this the RF network interface may include, for example, a return path demodulator (RPD) that receives out-of-band QPSK or QAM modulated signals from the STBs. Alternatively, if the broadband access network and the STB are compliant with the DOCSIS Set-top Gateway Interface (DSG), the signaling messages may be communicated between the set top boxes and the RF network interface 240 over a DSG tunnel. In yet other implementations the signaling messages may be communicated over the broadband access networks using the Internet suite of protocols.

Connectivity between the PSTN 28 and the broadband access networks 15 and 25 can be accomplished using the BBI and gateway nodes that are often used to provide connectivity to such networks. For instance, signaling gateways are commonly employed to convert signaling messages from one protocol to another protocol. If the BBIs employ SIP for call signaling and the PSTN employs the conventional signaling system 7 (SS7) signaling protocol, then SIP gateways may be employed to convert between SIP messages and SS7 messages.

Other gateway nodes are commonly used to convert transport streams such as video transport streams from one protocol to another. For instance, gateways may be used to convert video transport streams (e.g., MPEG or H.264 transport streams) carried by the broadband access networks 15 and 25 to transport streams carried by the PSTN 28. In particular, audio only transport streams that originate or terminate through the PSTN 28 may employ the use of RTP gateways 62 and 64 in order to convert audio to an MPEG stream. Accordingly, an RTP gateway 62 and 64 is employed between the output of each BBI and the PSTN 28. In this example the RTP gateway 62 and 64 may be included within the Internet 50. Instead of RTP, other protocols that may be employed by the PSTN 28 include QuickTime, MediaPlayer and the like.

Figure 3:
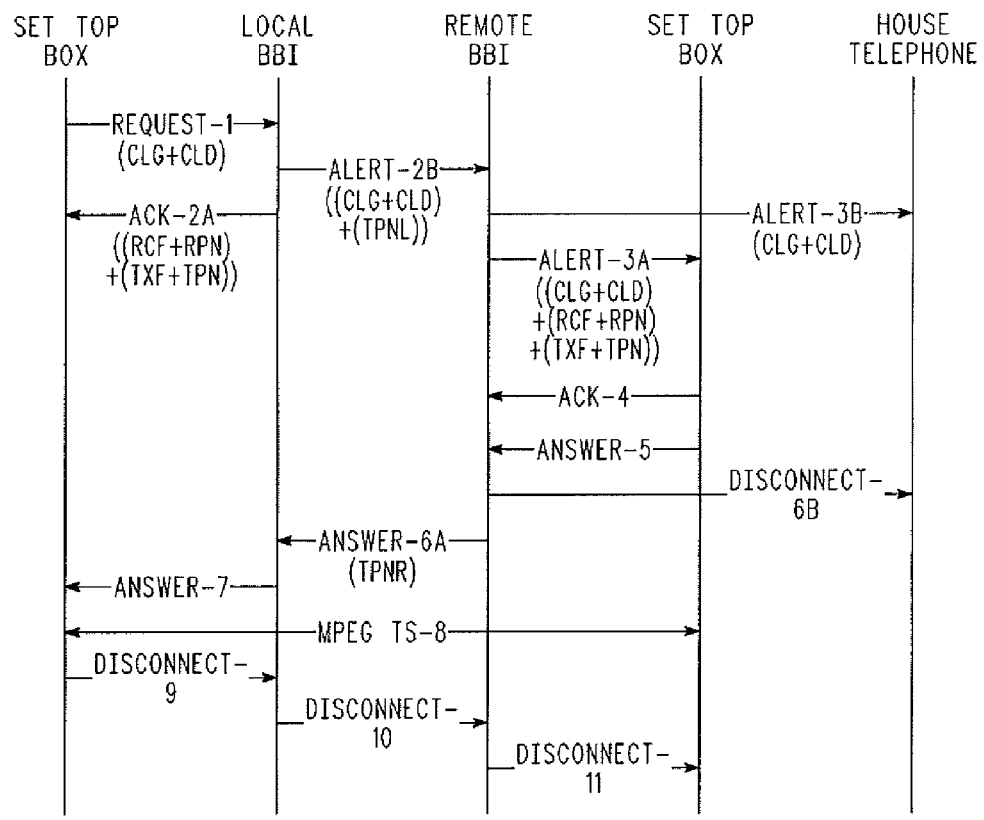
FIG. 3 shows a signaling or call flow diagram illustrating the process by which a call is established between a local subscriber and a remote subscriber.

FIG. 3 shows a signaling diagram that will be used to facilitate an understanding of the process by which a call is established between the local subscriber 10 and the remote subscriber 20. The signaling diagram shows the interactions between the various network elements shown in FIG. 1. To further clarify an understanding of the process, the signals or messages 1-11 shown in FIG. 3 are also superimposed on FIG. 1. In this example the local subscriber 10 is the calling party who initiates the call to the remote subscriber 20, who is the called party. The local subscriber 10 initiates the call using the local STB 12 and the remote subscriber 20 answers the call using the remote STB 22. This example assumes for the purposes of illustration only that the video transport streams that are employed are MPEG transport streams and that the protocols employed are SIP and RTP protocols. However, as noted above, the methods and techniques discussed herein are not limited to such an implementation.

Referring to FIG. 3, the local subscriber 10 initiates the call through a user interface associated with the local STB 12. The user interface, which may be, for example, a remote control unit or the like, may contain a physical or virtual button that is used to initiate the call. Instead of a button, the subscriber may select an item from a menu of options that are presented on a display associated with the user interface. More generally, however, the user interface may be configured in any desired manner and is not limited to the examples discussed herein. The local subscriber 10 also enters the telephone number of the called party (i.e., the remote subscriber 20) through the user interface. In response, the STB 12 sends a request message to the local BBI 30 at 1. The message includes the MAC address of the called party (CLD) and the telephone number of the calling party (CLG). The local BBI 30 queries its call manager database to translate the calling party's MAC address to its corresponding telephone number.

Next, at 2B, the local BBI 30 creates a new message that is sent to the remote BBI. This new message includes the telephone numbers of the calling and called parties as well as the MPEG program number of the MPEG stream that is to be transmitted from the local BBI 30 to the remote BBI 40, which is referred to in the signaling diagram as the Transmitting MPEG Stream of the Local BBI ("TPNL").

The local BBI 30 uses its frequency handler to allocate the receive frequency (RCF), the receive program number (RPN), the transmit frequency (TXF), and the transmit program number (TPN) that are to be used by the local STB 10 when communicating over the local broadband access network 15. This information, along with the modulation mode that is employed, is sent by the local BBI 30 to the STB 12 in an acknowledgement message at 2A. As previously mentioned, the local BBI 30 obtains this information from a poll of frequencies provided by the MSO operating the local broadband access network 15. In some cases, instead of sending each of these individual items to the STB 12, the acknowledgement message may include a virtual channel number.

After receiving the message that was sent by the local BBI 30 at 2A, the remote BBI 40 queries its call manager database to translate the called party's telephone number into its corresponding MAC address. Given the MAC address, the remote BBI 40 then sends an alert message to the remote STB 22 at 3A. The alert message includes the receive frequency (RCF), the receive program number (RPN), the transmit frequency (TXF), the transmit program number (TPN) and the modulation mode that are to be used by the remote STB 22 when communicating over the remote broadband access network 25. Upon receiving the alert message, the remote STB 22 will notify the remote subscriber 20 that an incoming call is being received. The notification may be presented to the subscriber on a television or other display device associated with the STB 22. The message may be presented using any appropriate mechanism, including, for example, Picture in Picture (PIP), closed caption, or a GUI that is similar to an electronic program guide. The message will notify the remote subscriber that an incoming call is being received and will ask the subscriber if he or she would like to accept the call. The message may include the name and/or telephone number of the calling party.

In addition to notifying the remote subscriber of the incoming call via the STB 22, the remote BBI 40 will also notify the remote subscriber 20 of the incoming call via the telephony interface to the remote telephone 24. To this end, at 3B the remote BBI 40 will send an alert to the remote telephone 24 via the SIP gateway 64 and the PSTN 28. The alert will contain the calling and called parties' telephone number. The remote subscriber 20 now has the option of answering the call on the remote telephone 24 or the remote STB 22. In addition, a time out counter is started that upon expiration will terminate the process if the subscriber does not respond.

In this particular example the subscriber answers the incoming call via the STB 22. In response the STB 22 sends an acknowledgement message to the remote BBI 40 at 4 and an answer message at 5. The remote BBI 40, in turn, at 6A sends an answer message to the local BBI 30 via Internet 50. The answer message includes the MPEG program number of the MPEG stream that is to be transmitted from the remote BBI 40 to the local BBI 30, which is referred to in the signaling diagram as the Transmitting MPEG Stream of the Remote BBI ("TPNR").

Since the remote subscriber answered the call using the remote STB 40, a disconnect message is sent to remote phone by the remote BBI 40 at 6B via the telephony interface.

The answer message received by the local BBI 30 is propagated to the local STB 12 via the broadband access network 15 at 7. The MPEG call connection is now established at 8 between the local and remote STBs over the broadband networks 15 and 25 and the Internet 50. Finally, when either party terminates the call, a disconnect message propagates from one STB to another. In this example the local STB 12 terminates the call and the disconnect message is propagated at 9, 10 and 11.

Figure 4:
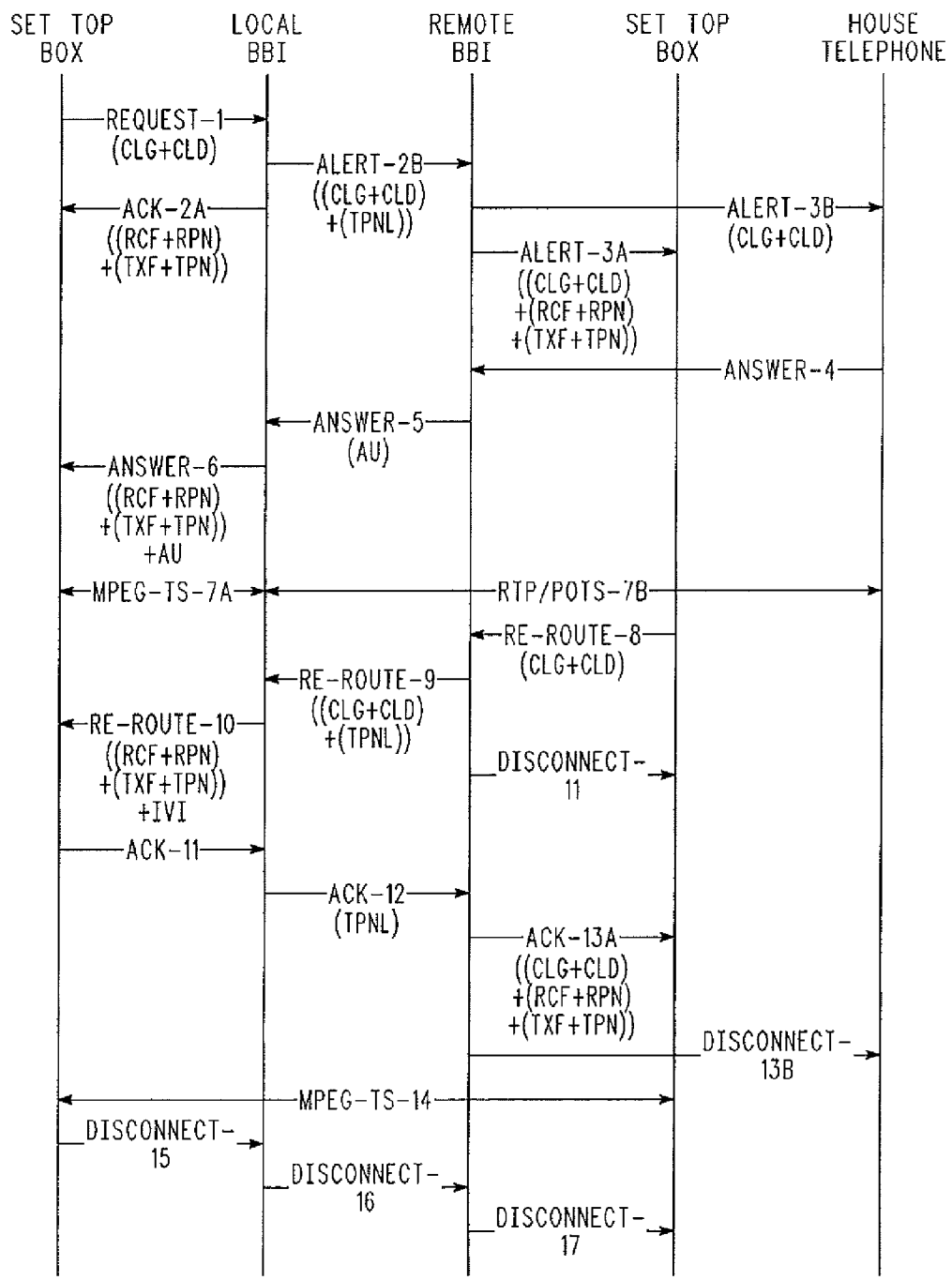
FIG. 4 shows another signaling diagram for a scenario in which a local subscriber initiates a call to the remote subscriber and a remote subscriber answers the call on a remote telephone and then switches to a set top box so that the call can be received as a video call.
Figure 5:
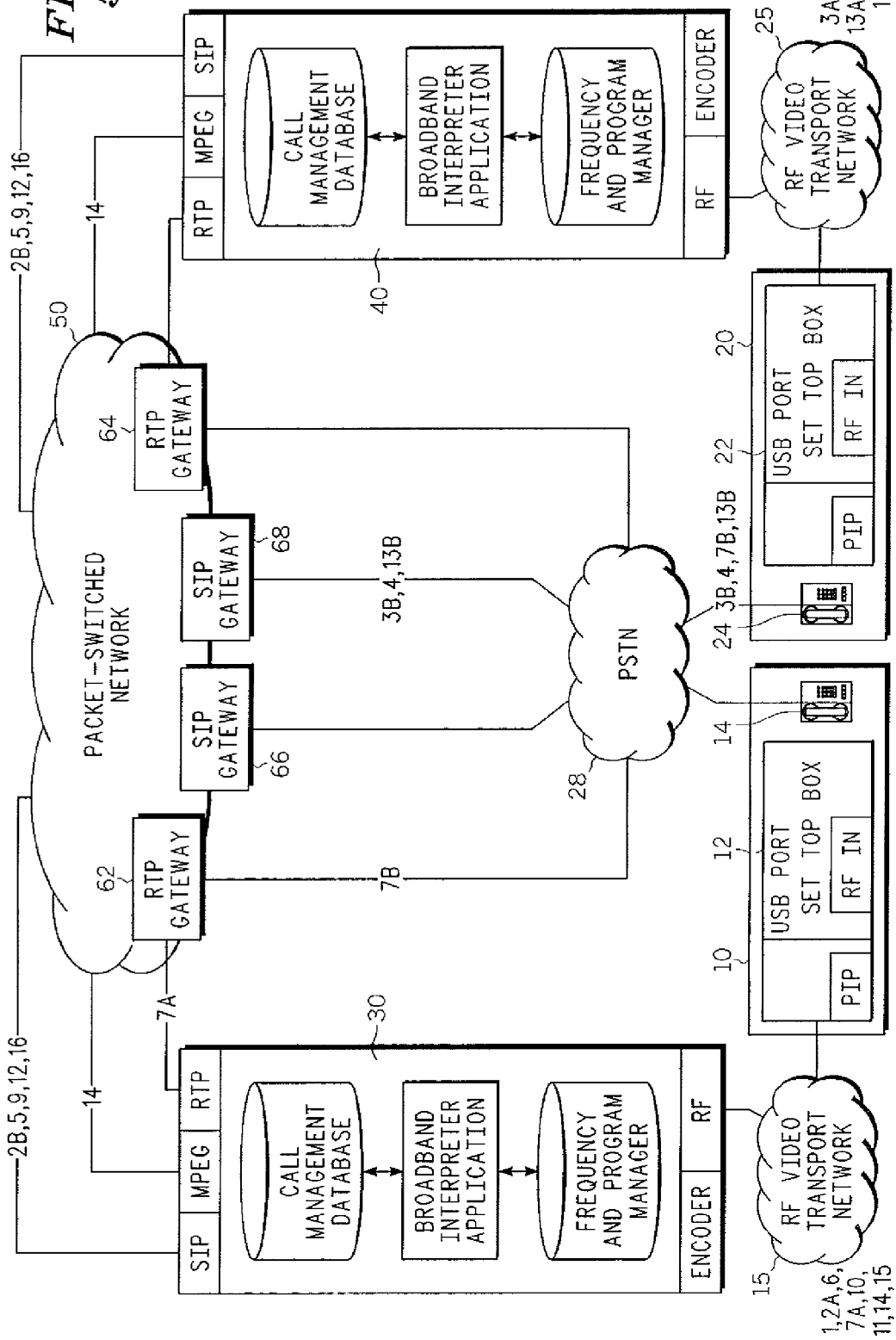
FIG. 5 shows an operating environment similar to FIG. 1 except with messages superimposed which correspond to the signaling diagram of FIG. 4.

FIG. 4 shows another signaling diagram for a scenario in which the local subscriber 10 initiates a call to the remote subscriber 20 using the STB 12 and the remote subscriber 20 answers the call on the remote telephone 24 and then switches to the remote STB 22 so that the call can be received as a video call. The signals or messages 1-17 shown in FIG. 4 are also superimposed on FIG. 5, which is otherwise the same as FIG. 1.

When the local subscriber 10 initiates the call request, alert and acknowledgement messages are sent at 1, 2A, 2B, 3A and 3B. These messages are the same as their corresponding messages shown in FIG. 3 and thus do not need to be discussed further.

At message 4, when the remote subscriber 20 answers the remote telephone 24 an answer message is sent by the remote telephone 24 to the remote BBI 40 via the PSTN 28 and the SIP gateway 68. The remote BBI 40 propagates the answer message to the local BBI 30 over the Internet 50 at 5. The remote BBI 40 indicates in the answer message that the answered call is audio only by including an audio only indicator (AUI).

Since the call is audio only, the amount of bandwidth that is needed is less than if the call were a video call. Accordingly, the local BBI 30 may wish to reduce the amount of bandwidth that it allocated at 2A. Accordingly, the local BBI 30 may once again use its frequency handler to allocate a new receive frequency (RCF), receive program number (RPN), transmit frequency (TXF), and transmit program number (TPN) that are more suitable for an audio only call. This information, which is used by the local STB 12 when communicating by voice only over the local broadband access network 15, is sent by the local BBI 30 to the STB 12 in an answer message at 6.

At this point signaling is complete and the call can now be established. At 7A, the local STB 12 sends voice information in an MPEG transport stream to the local BBI 30, which in turn forwards it to the RTP gateway 62 so that the information can be converted from an MPEG transport stream to a transport stream that corresponds to RTP (or other suitable protocol). The RTP transport stream is forwarded by the RTP gateway 62 to the PSTN 28 at 7B, which in turn forwards it to the remote telephone 24.

At some point during the voice-only call the remote subscriber decides to switch to a video call. That is, the remote subscriber 20 decides to re-route the call from the remote telephone 24 to the remote STB 22. The re-route process is initiated when the remote subscriber 20 sends a re-route message to the remote STB 22 via its user interface by, e.g, depressing a re-route button on a remote control unit. In response, the STB 22 sends a re-route request to the remote BBI 40 at 8. The remote BBI 40 recognizes that a call is in progress and that the remote subscriber 20 has requested to switch from receiving the call over the PSTN 28 to receiving the call over the broadband access network 25. Before the re-route can be implemented, the remote BBI 40 needs to ensure that sufficient resources (e.g., bandwidth) are available in both directions for a video call. Accordingly, at 9 the remote BBI 40 sends a re-route message to the local BBI 30. The re-route message includes the telephone numbers of the calling and called parties as well as the MPEG program number of the MPEG stream that is to be transmitted from the remote BBI 40 to the local BBI 30, which is referred to in the signaling diagram as the Transmitting MPEG Stream of the Remote BBI ("TPNR"). Upon receipt of this message, the local BBI 30 determines, using its frequency handler, if bandwidth resources are available on the local broadband access network 15 and if so, sends a re-route message to the local STB 12 at 10. If necessary, this re-route message includes a new receive frequency (RCF), receive program number (RPN), transmit frequency (TXF), and transmit program number (TPN), which are to be used by the local STB 12 when communicating over the local broadband access network 15. The re-route message also includes a video indicator (IVI) to inform the local STB 12 that the call is a video call.

Upon receiving the re-reroute message from the local BBI 30 the local STB 12 sends an acknowledgement message back to the local BBI 30 at 11. The local BBI 30 in turn, forwards the acknowledgement message to the remote BBI 40 at 12 and includes the MPEG program number of the MPEG stream that is to be transmitted from the local BBI 30 to the remote BBI 40 (the "TPNL"). The remote BBI 40 then sends an acknowledgement message to the remote STB 22 at 13A. The acknowledgement includes the new receive frequency (RCF), receive program number (RPN), transmit frequency (TXF), and transmit program number (TPN) that are to be used by the remote STB 22 when communicating by video over the remote broadband access network 25, which the remote BBI 40 has allocated using its frequency handler. At 13B the remote BBI 40 sends a disconnect message to the remote telephone 24.

The MPEG video call connection is now established at 14 between the local and remote STBs over the broadband networks 15 and 25 and the Internet 50. Finally, when either party terminates the call, a disconnect message propagates from one STB to the other. In this example the local STB 12 terminates the call and a disconnect message is propagated at 15, 16 and 17.

In some implementations subscribers may opt to use a video voice mail service that answers calls on their behalf by playing a pre-recorded video file to the calling party. Additionally, the calling party may opt to leave a video voice mail message to the called party. As such the BBI will handle, route and deliver the call to either a video voice mail server as described below in connection with FIG. 6 or a STB capable of storing such a video voice mail message. In this way if the subscriber does not answer the call on the STB or telephone within a predefined period of time, the BBI's call manager will determine if the subscriber subscribes to video voicemail and, if so, route the call accordingly. The caller manager 210 shown in FIG. 2 may keep track of which subscribers have subscribed to the video voicemail service. For instance, the entries in database 215 which have an entry for each registered subscriber may include a column that specifies if the subscriber also subscribes to the video voicemail service. If the subscriber does subscribe to the service, the call will be re-routed to the video voicemail server or answered by a video voice mail application residing on the subscriber's STB. Similarly, if the subscriber issues a "do-not-disturb" message though the STB, all calls will be immediately re-routed to the video voicemail server or the video voice mail application residing on the STB. The video voicemail service may also include a message indicator capability to enable the video voice mail application and the STB to exchange information relating to video voice mail messages. Subscribers will use the STB user interface to retrieve received messages from the video voicemail server or a local storage medium (e.g., a hard drive) associated with the STB.

Figure 6:
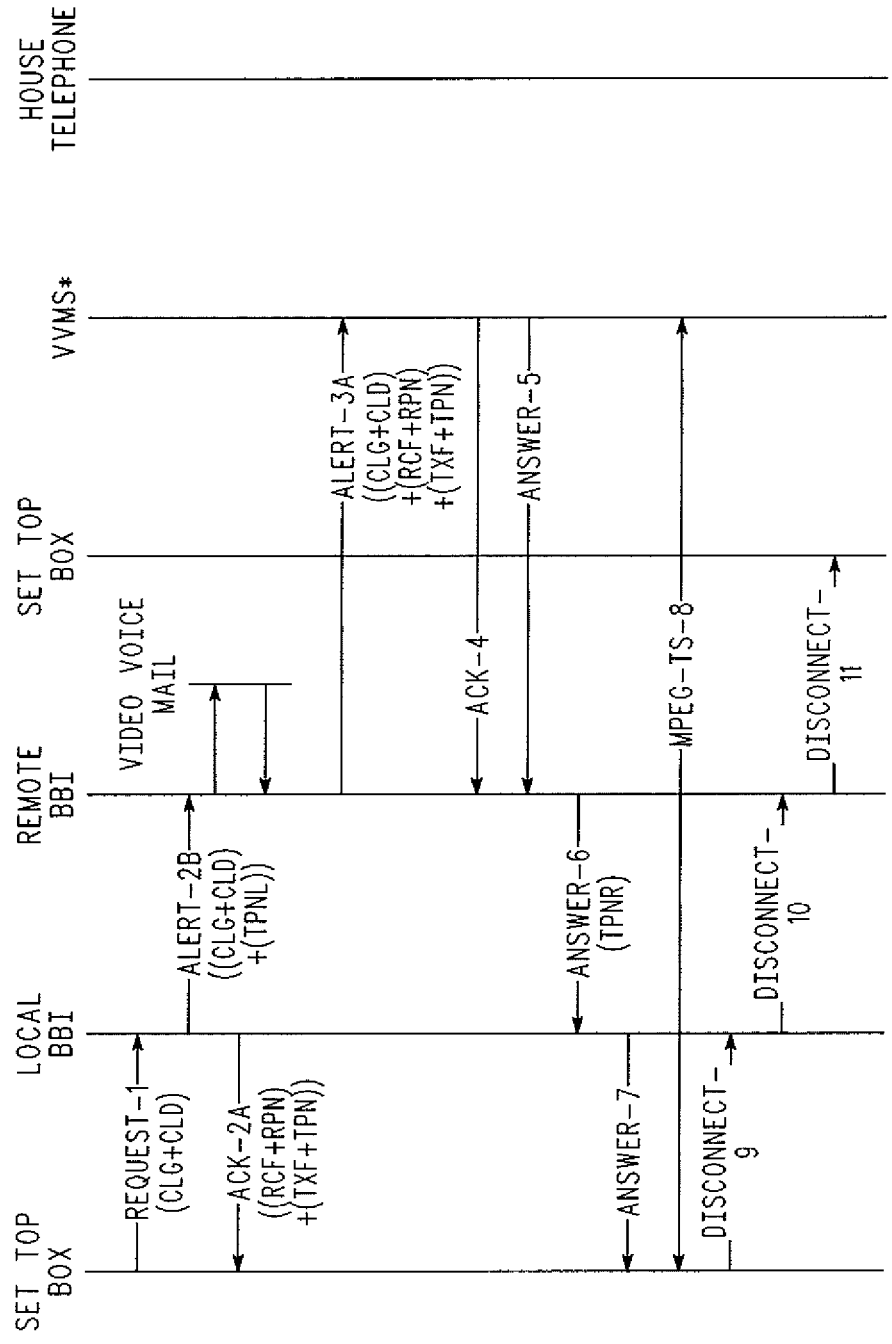
FIG. 6 shows yet another signaling diagram for a scenario in which a local subscriber initiates a call to a remote subscriber who does not want to be disturbed and thus has elected to have his or her message go directly to video voice mail.
Figure 7:
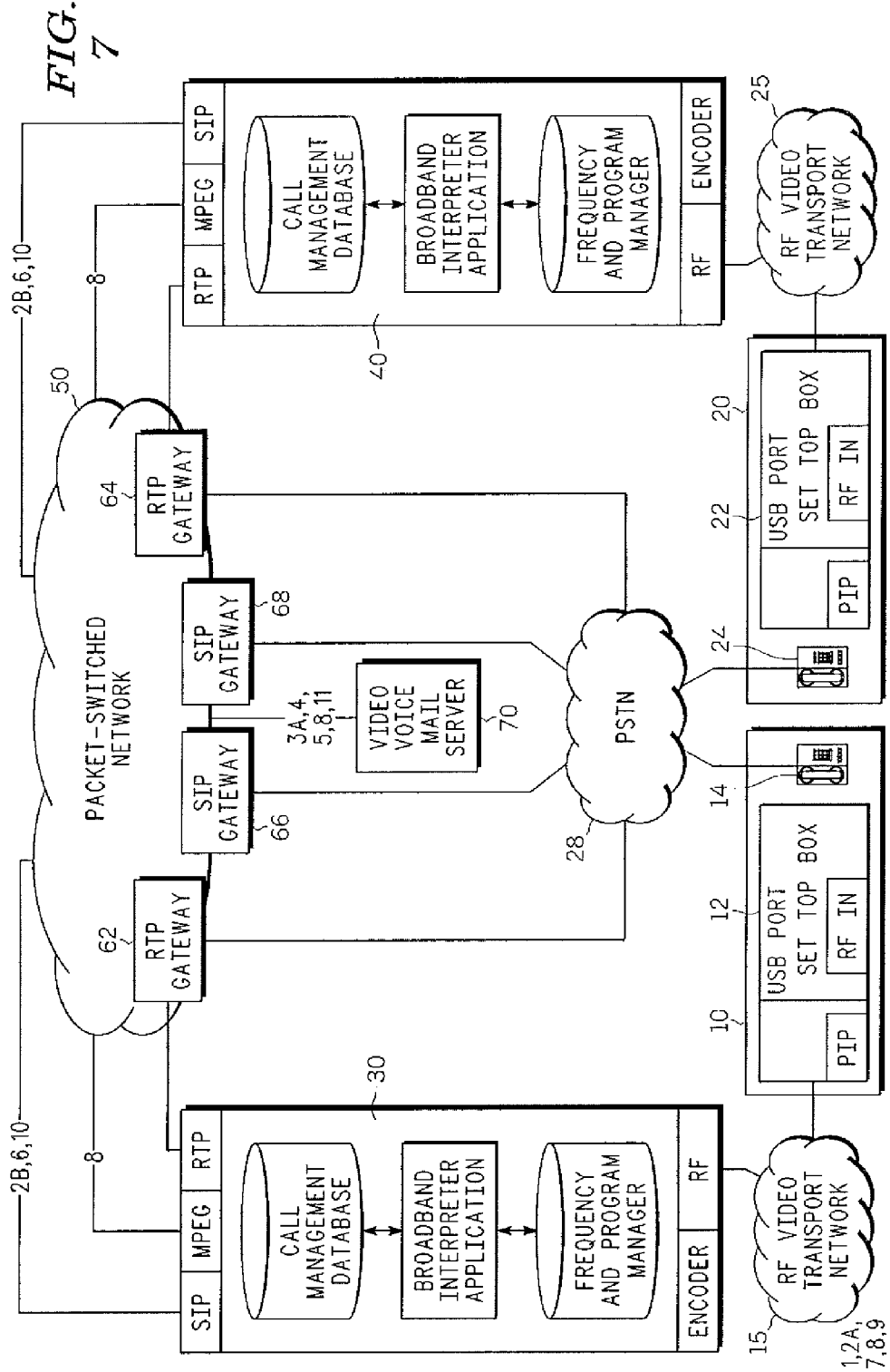
FIG. 7 shows an operating environment similar to FIG. 1 except that it also illustrates a video voice mail server that may be used in connection with the signaling diagram shown in FIG. 6.

FIG. 6 shows a signaling diagram for a scenario in which the local subscriber 10 initiates a call to the remote subscriber 40, who does not want to be disturbed and thus has elected to have his or her message go directly to video voice mail. This implementation depicts a video voice mail server on which messages are stored and retrieved. The signals or messages 1-11 shown in FIG. 6 are also superimposed on FIG. 7, which is similar to FIG. 1 except that it also illustrates video voice mail server 70.

When the local subscriber 10 initiates the call request, alert and acknowledgement messages are sent at 1, 2B and 2A. These messages are the same as their corresponding messages shown in FIG. 3 and thus do not need to be discussed further. After the remote BBI 40 is notified of the incoming call at 2B, the remote BBI determines that all messages for this subscriber are to be routed to the video voicemail server 70. This determination may be accomplished when the remote BBI 40 accesses its subscriber database to translate the called telephone number to the remote STB MAC address. Accordingly, at 3A the remote BBI sends an alert message to the video voicemail server 70. The message includes the receive frequency (RCF), the receive program number (RPN), the transmit frequency (TXF), and the transmit program number (TPN) that are to be used by the video voicemail server. In response, the video voicemail server sends an acknowledgement and answer messages back to the remote BBI 40 at 4 and 5, respectively. The answer message is propagated back to the local STB 30 at 5, 6 and 7.

The MPEG call connection is now established at 8 between the local STB and the video voicemail server 70. Finally, when the local subscriber or the video voicemail server terminate the connection, a disconnect message propagates from one device to another. In this example the local STB 30 terminates the call and the disconnect message is propagated at 9, 10 and 11. The video voicemail server may terminate the connection when a timeout period has expired, for example.

The video voice mail call depicted in FIG. 6 is only one illustrative implementation of a video voice mail service. For instance, as previously mentioned, in other implementations the subscribers may use their STB's storage medium for message retrieval and storage. In such an implementation calls are routed, handled and switched through the network as previously described in connection with FIG. 3 and the call is answered by the video voice mail application residing on the called STB. The only difference at this point is that the calling party is conversing with the called party's video voice mail application, which records and stores their message on a storage medium associated with the called STB.

Figure 8:
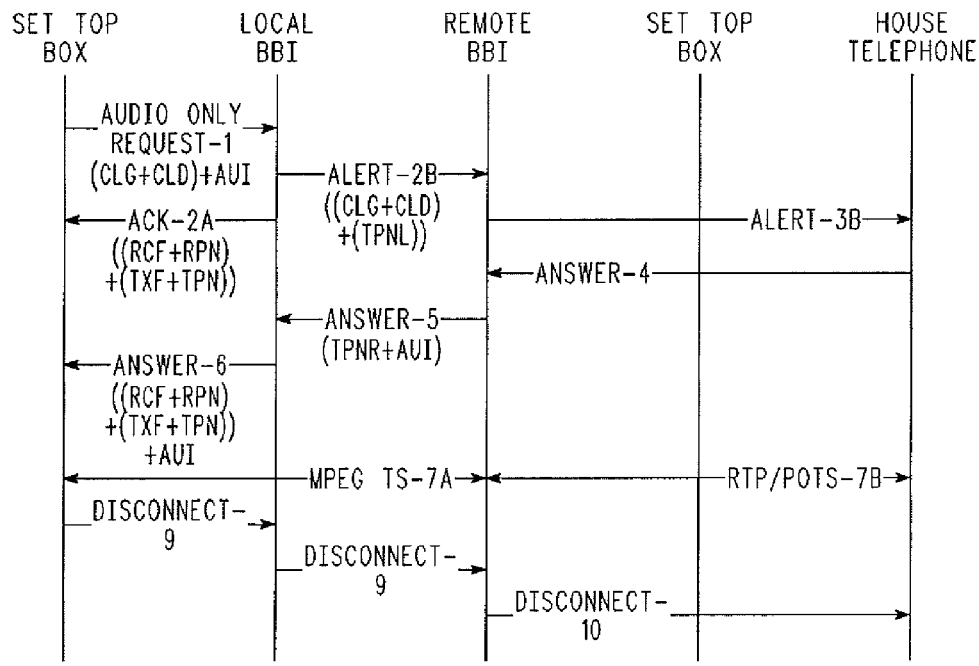
FIG. 8 is a signaling diagram for a scenario in which the calling party uses a set top box to initiate a voice-only call.

The call scenarios described above are representative only. Many additional such scenarios are possible. For instance, FIG. 8 is a call flow diagram for a scenario in which the calling party uses a STB to initiate a voice-only call. Once again, the signals or messages 1-11 are also superimposed on the network diagram, in this case FIG. 9. The remote BBI determines that there is no STB associated with the called party's telephone number and thus routes the call to the called party's telephone via the telephony interface.

Figure 10:
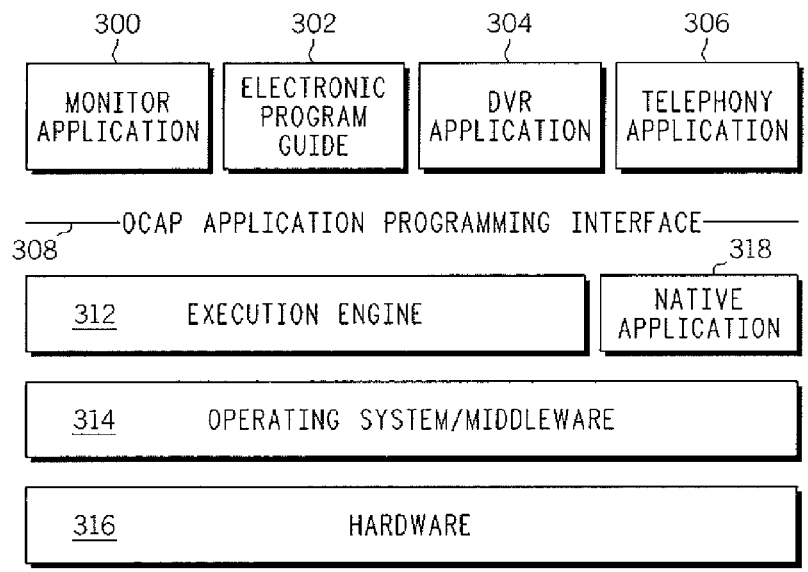
FIG. 10 shows the logical architecture of one particular example of a client device which is configured as set top box.

FIG. 10 shows the logical architecture of one particular example of a client device which is configured as set top box. It should be noted that the set top box may be any apparatus such as a hardware card, specially programmed computer or other device having the functionality described herein that may be placed near to or within a television or other display device (such as a computer monitor). The set top box can receive broadcast, video-on-demand (VOD) and other content from a broadband access network such as seen in FIG. 1.

In the example shown in FIG. 10 the set top box is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the client devices 106 may be compliant with MHEG, DASE or Multimedia Home Platform (MHP) middleware. Alternatively, the set top terminal may be based on a proprietary architecture.

Referring to FIG. 10, the top of an OCAP software "stack" includes various conventional application modules such as a Monitor Application Module 300, Electronic Program Guide (EPG) Module 302, and Digital Video Recorder (DVR) application Module 304. In addition, the set top box includes a Telephony Application Module 306 for implementing the functionality that allows the set top box to establish telephony calls in the manner described above. These applications are run on top of a software layer called the "Execution Engine" 312 and interface to the Execution Engine using the well known OCAP APIs 308. The client device may also include certain software applications or "Native Applications" 318 that do not run within the Execution Engine, but run directly on top of the Operating System/Middleware 314 for the client device. Native Applications are typically written for, e.g., a particular hardware configuration 316 of the client device 106. Examples of such Native Applications may include management of front panel functionality, remote control interaction, games, and the like. It should be noted that while Monitor Application Module 300, Electronic Program Guide (EPG) Module 302, DVR Application Module 304 and Telephony Application Module 306 are depicted as residing on top of the execution engine 312, in some cases one or more of these applications may be integrated with the execution engine 312 or any other module residing below the OCAP APIs 308. Accordingly, processes that are described herein as being performed by the Telephony Application Module may alternatively be performed by the execution engine 312 or any other appropriate module or component. In yet other alternatives, the functionality of the Telephony Application Module 306 may be implemented in hardware or a combination of hardware, software and firmware.

In addition to the features mentioned above, the set top box or other client device will need a camera and microphone along with suitable encoders in order to capture audio and video. Optionally, the client device may also have a user interface such as a remote control unit that includes a telephone keypad along with buttons or the like that allows the subscriber to access and activate the telephony application. Additionally, the Telephony Application Module 306 may store files that contain various prompts and messages to be presented to the subscriber at the appropriate time. For instance, as previously mentioned, one message may inform the subscriber of the arrival of an incoming call. Another message may be a pop-up that appears on the calling party's display when a call is initiated requesting the subscriber to wait while the call is being connected. The messages may be presented in any appropriate format. For instance the prompts and messages may appear as graphical user interface (GUI) pop-ups or as close-captioned text, for example. If the set top box is so equipped, the prompts and messages may be presented using picture-in-picture (PIP) functionality.

The processes described above, including but not limited to those presented in connection with the local and remote BBIs and the client devices, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, or silicon memory (e.g., removable, non-removable, volatile or non-volatile).

The invention claimed is:

1. A call processing module, comprising a frequency handler for dynamically allocating to a client device a receive frequency and a transmit frequency from a set of frequencies in an active channel map that are available for use for a telephony call based on the active channel map dynamically updating a relationship of channels to services delivering programming content carried on the channels, said receive frequency and transmit frequencies being used by the client device over a broadband access network during the telephony call, wherein the frequency handler is configured to dynamically allocate, for use by the client device during communication between the call processing module and the client device over the broadband access network, the receive and transmit frequencies, and a program ID from among receive and transmit frequencies and program IDs available in the active channel map at a time a call setup is requested, a notification of available receive and transmit frequencies and available program IDs being provided to the call processing module, at the time of call setup, from an operator of the broadband access network; and The call processing module, further comprising a session manager configured to generate and receive signaling messages for establishing the telephony call between a local subscriber and a remote subscriber over the broadband access network and a packet-switched network as well as over the broadband access network and a circuit-switched network in communication with the packet-switched network, wherein the session manager includes a Session Initiation Protocol (SIP) server and client that respectively transmits and receives SIP signaling messages over the packet-switched network to and from the remote subscriber.

2. The call processing module of claim 1, further comprising:
a first network interface configured to communicate over a packet-switched network; and
a second network interface configured to communicate with a local subscriber over the broadband access network,
wherein the second network interface includes a return path for receiving signals from the client device in accordance with a scheme that employs an Internet Protocol (IP), a Data Over Cable Service Interface Specification (DOCSIS) tunnel, Quadrature Phase Shift Keying (QPSK) modulation or Quadrature Amplitude Modulation (QAM).

3. The call processing module of claim 1, further comprising:
a first network interface configured to communicate over a packet switched network; and
a second network interface configured to communicate with a local subscriber over the broadband access network,
wherein the first network interface is further configured to forward over the packet-switched network a video transport stream supporting the telephony call to a remote subscriber.

4. The call processing module of claim 3, wherein the second network interface is further configured to forward the video transport stream over the broadband access network to the client device.

5. A method for establishing a telephony call, comprising receiving over a local broadband access network a request from a calling party to establish a telephony call between the calling party and a called party, the request including a telephone number of the called party, said local broadband access network employing an active channel map that dynamically updates a relationship of channels to services delivering programming content carried on the channels and dynamically allocating, for use by a client device of the called party during communication between a call processing module and the client device over the local broadband access network, receive and transmit frequencies, and a program ID from among receive and transmit frequencies and program IDs available in the active channel map at a time a call setup is requested, a notification of available receive and transmit frequencies and available program IDs being provided to the call processing module, at the time of call setup, from an operator of the local broadband access network; and The call processing module, further comprising using a session manager configured to generate and receive signaling messages for establishing the telephony call between a local subscriber and a remote subscriber over the broadband access network and a packet-switched network as well as over the broadband access network and a circuit-switched network in communication with the packet-switched network, wherein the session manager includes a Session Initiation Protocol (SIP) server and client that respectively transmits and receives SIP signaling messages over the packet-switched network to and from the remote subscriber.

6. The method of claim 5, further comprising presenting a response to the calling party from the called party by transmitting one or more additional messages to the calling party over the local broadband access network using a frequency that is available for use for the telephony call based on the dynamically updated relationship of channels to services delivering the programming content carried on the channels, at least one of the additional messages indicating if the telephony call will be answered as a voice-only telephony call or as a video telephony call and identifying a channel to be used by the calling party when communicating with the called party over the local broadband access network, wherein the local broadband access network employs QAM modulation and the at least one of the additional messages identifies the channel by including a receive frequency, a transmit frequency and a program number to be used by the calling party when communicating with the called party over the local broadband access network.

7. The method of claim 5, wherein the client device is a set top box and the telephony call is a video telephony call.

8. The method of claim 5, wherein the broadband access network employs Quadrature Amplitude Modulation (QAM) in a forward direction from the broadband access network to the client device.

9. The method of claim 5, further comprising alerting a call processing unit of the request by transmitting an alert message over a packet-switched network, wherein alerting the call processing unit is performed in accordance with a Session Initiation Protocol (SIP) protocol.

10. The method of claim 5, wherein the request is received over the local broadband access network in accordance with a scheme that employs an Internet Protocol (IP), a Data Over Cable Service Interface Specification (DOCSIS) tunnel, Quadrature Phase Shift Keying (QPSK) modulation or Quadrature Amplitude Modulation (QAM).

11. The method of claim 5, wherein the frequency from the channel map is a lower bandwidth frequency when the telephony call is a voice-only call as compared to a video telephony call.

12. At least one non-transitory computer-readable medium encoded with instructions which, when executed by a processor, performs a method including:
  receiving over a packet-switched network a request to establish a telephony call between a calling and called party, the request including a telephone number of the called party;
  determining a network address of a client device associated with the called party based on the telephone number; and
  forwarding, over a broadband access network employing Radio-Frequency (RF) modulation on a plurality of channels, a first alert message to the client device using the client device network address, the first alert message identifying one of the plurality of channels on which an incoming telephony call can be received by the client device,
  wherein one of the plurality of channels on which the incoming telephony call can be received over the broadband access network is identified to the client device by a receive frequency, a transmit frequency, a program number and a modulation mode to be used by the client device when communicating with the calling party, and
  wherein the receive and transmit frequencies and the program number, for use by the client device of the called party during communication between a call processing module and the client device over the broadband access network, are dynamically allocated from among receive and transmit frequencies and program numbers available in an active channel map at a time a call setup is requested, a notification of available receive and transmit frequencies and available program numbers being provided to the call processing module, at the time of call setup, from an operator of the local broadband access network; and
  The call processing module, further comprising a session manager configured to generate and receive signaling messages for establishing the telephony call between a local subscriber and a remote subscriber over the broadband access network and a packet-switched network as well as over the broadband access network and a circuit-switched network in communication with the packet-switched network, wherein the session manager includes a Session Initiation Protocol (SIP) server and client that respectively transmits and receives SIP signaling messages over the packet-switched network to and from the remote subscriber.

13. The computer-readable medium of claim 12, wherein the request to establish the telephony call includes an identity of a first video transport stream on which the telephony call is to be received over the packet-switched network, and wherein the method further comprises receiving a first answer message from the client device over the broadband access network indicating acceptance of the incoming call, and forwarding a second answer message to the called party over the broadband access network, the second answer message indicating the acceptance of the incoming call.

14. The computer-readable medium of claim 12, wherein the method further comprises forwarding, in addition to the first alert message, over a circuit-switched network a second alert message to a telephone associated with the telephone number of the called party, wherein the first and second alert messages inform the called party of the incoming telephony call, and wherein the second alert message is forwarded in accordance with a signaling protocol employed by the packet-switched network to a gateway configured to translate the second alert message to a signaling protocol employed by the circuit-switched network.

15. The computer-readable medium of claim 12, wherein the method further comprises receiving a first answer message from the telephone over a circuit-switched network indicating acceptance of the incoming telephony call, and forwarding a second answer message to the called party over the broadband access network, the second answer message indicating the acceptance of the incoming telephony call as a voice-only call.

16. The computer-readable medium of claim 15, wherein the method further comprises receiving a re-route message from the telephone requesting that the incoming telephony call be re-routed as a video telephony call from the telephone to the client device associated with the called party, determining if sufficient resources are available to support the video telephony call, and if sufficient resources are determined to be available, forwarding an acknowledgement message to the client device using the client device network address, the acknowledgement message identifying a second one of the plurality of channels on which the video telephony call can be received by the client device on the broadband access network.

17. The computer-readable medium of claim 12, wherein, if an answer message indicating acceptance of the incoming telephony call is not received from either the telephone or the client device within predetermined period of time, then the method further comprises sending a second alert message to a video voicemail server indicating that an incoming video telephony message will be transmitted for the called party, the second alert message identifying a second one of the plurality of channels on which the video telephony message can be received by the video voicemail server or a storage medium associated with the client device.

18. The computer-readable medium of claim 12, wherein the method further comprises:
  if a first answer message is received from the client device indicating acceptance of the incoming telephony call before a second answer message is received from the telephone indicating acceptance of the incoming telephony call, forwarding a second answer message to the called party over the broadband access network, the second answer message indicating the acceptance of the incoming telephony call and including an identity of second video transport stream on which the incoming telephony call will be forwarded to a second client device associated with the calling party; and
  if the second answer message is received from the telephone indicating acceptance of the incoming telephony call before receipt of the first answer message from the client device, forwarding a third answer message to the called party over the broadband access network, the third answer message indicating the acceptance of the incoming telephony call as a voice-only call.

* * * * *